Nov. 29, 1938.     A. G. KERNIN     2,138,278
METHOD OF RECOVERING HEAT AND CHEMICALS FROM WASTE LIQUORS
Filed Aug. 10, 1936     2 Sheets—Sheet 2
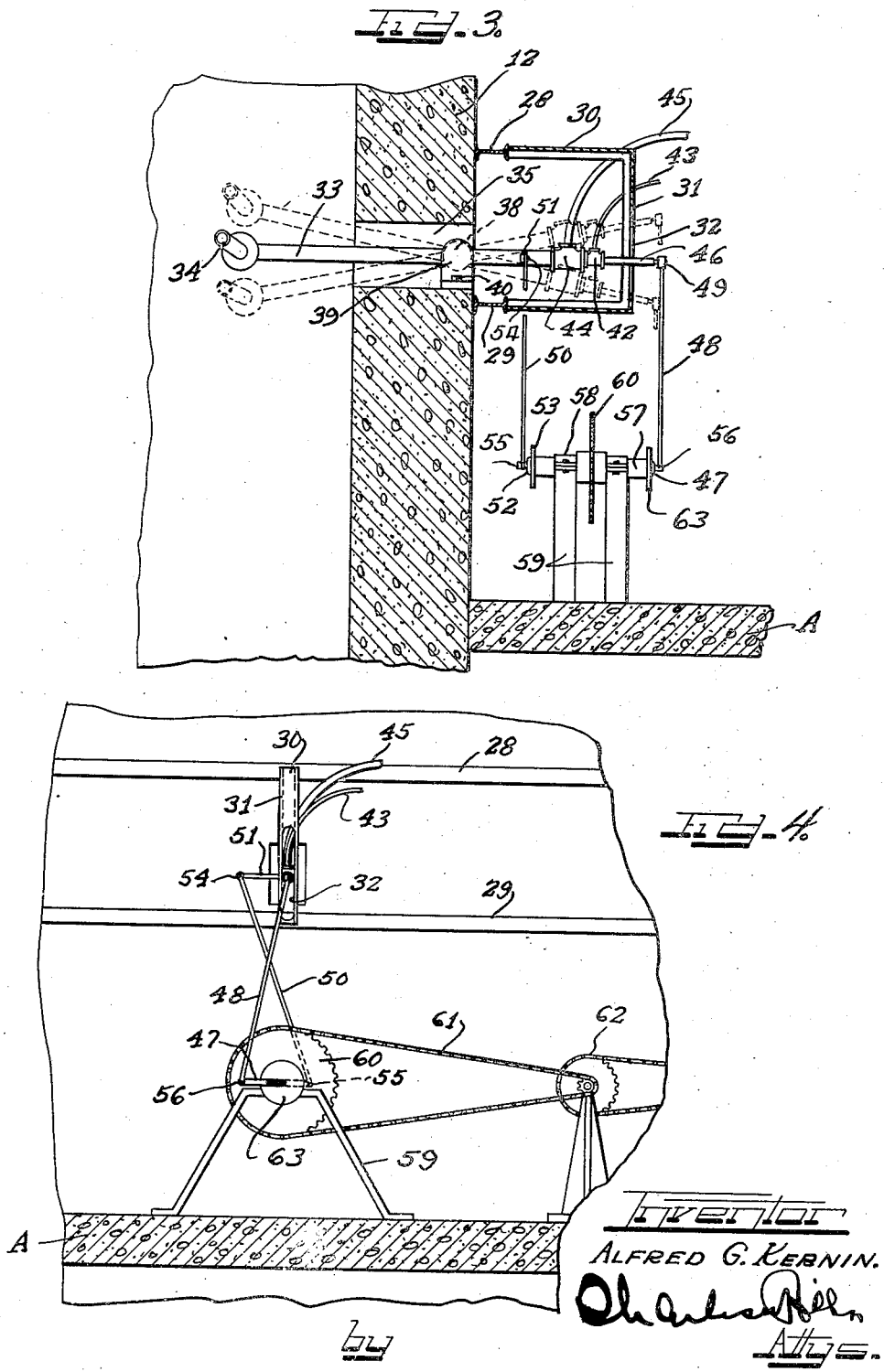

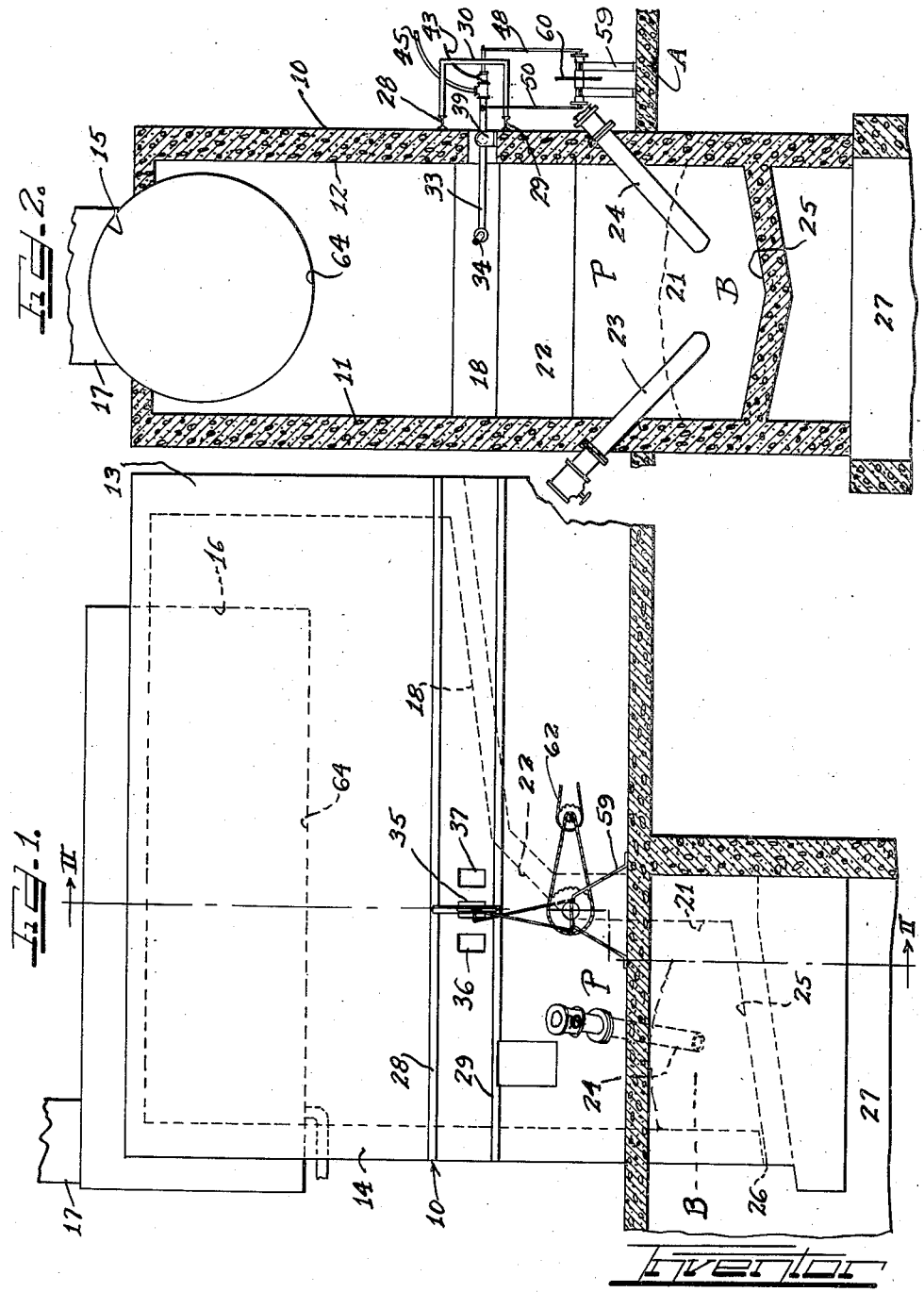

Patented Nov. 29, 1938

2,138,278

UNITED STATES PATENT OFFICE 2,138,278

METHOD OF RECOVERING HEAT AND CHEMICALS FROM WASTE LIQUORS

Alfred G. Kernin, Mosinee, Wis., assignor, by mesne assignments, of sixty percent to The Babcock & Wilcox Company, New York, N. Y., a corporation of New Jersey, and forty percent to Canada Paper Co., Montreal, Quebec, Canada, a corporation of the Province of Quebec, Canada Application August 10, 1936, Serial No. 95,132

5 Claims. (Cl. 23—48)

This invention relates to a method of recovering heat and chemicals from waste liquors and more particularly to a self sustaining process for the recovery of heat and inorganic chemicals from black liquors produced in the manufacture of pulp by either the sulfate or soda process.

In my Patent No. 2,004,205, dated June 11, 1935, I have disclosed a smelting furnace of the horizontal type for use in the reclamation of heat and chemical values from black liquors. My present invention includes a modification of the same general type of furnace as that shown in my patent for use in carrying out an improved method of spray burning black liquors and reclaiming the heat and inorganic chemical values contained therein.

In accordance with the method of my present invention concentrated black liquor is sprayed into a horizontal type of furnace in an initially upward direction and the angle of spraying is preferably constantly varied so as to cause the sprayed black liquor to impinge against an extended surface, such as the lower surface of a boiler, which is exposed to the heat of the heated gases of combustion derived from the burning of the organic materials in the black liquor itself. A large part of the sprayed black liquor which impinges against the boiler surface or other surface as a target is largely dehydrated and charred by the time it hits such surface and falls therefrom through the heated gases into a pit where a bed of the dehydrated and partly charred material accumulates. Air is introduced into the bed to burn the organic combustibles therein but in insufficient amount to completely burn the gases resulting therefrom, at least in the case of sulfate black liquor, since in that case a reducing action must be carried out in the bed of materials to convert the sulfate present into sulfide. Additional air is supplied in the spraying zone to complete the combustion of these partly burned gases and furnish the heat for the dehydration of the fresh black liquor and also for regeneration of steam. A part of the heat developed in the bed of materials referred to is utilized in melting the inorganic chemicals so that they may be flowed out of the bed and recovered in accordance with the usual practice in sulfate mills.

It is an important object of this invention to provide a process such as described wherein the black liquor is sprayed in an initially more or less upward direction for impingement against a boiler surface or other target exposed to the hot combustion gases resulting from the burning of the volatilized organic materials contained in the black liquor, whereby the sprayed black liquor is largely dehydrated and charred before falling into the bed of accumulated black liquor residues where the reduction of sulfate to sulfide is being carried out, thereby maintaining more distinctly separated zones of reduction and of combustion and increasing the efficiency of the reclamation of heat and chemical values from the black liquor.

It is a further important object of this invention to provide a self sustaining process for the recovery of the heat and chemical values from black liquors in accordance with which the black liquor is sprayed in an initially upward direction against a suspended surface, such as the surface of a boiler, and falls therefrom in the form of thoroughly dehydrated and charred masses or fragments into a reduction pit, whereby the loss of metallic values by entrainment in the combustion gases going to the stack is largely eliminated and the black liquor residues are delivered in a form conducive to greater efficiency in the reduction of sulfate to sulfide.

It is a further important object of this invention to provide in a process such as described a more efficient method of spraying the black liquor into the recovery furnace, wherein the black liquor is sprayed through a constantly varying arc against a suspended, horizontally disposed boiler surface, from which the thoroughly dehydrated and charred residues of black liquor fall in comparatively large fragments or masses into the reducing portion of the furnace, and wherein the gases of combustion are led in a generally horizontal direction and air is supplied for complete combustion thereof in the zone in which the spraying is carried out.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical sectional view of a horizontal type of recovery furnace for use in carrying out the method of my invention, and illustrating an attachment for varying the arc through which the black liquor is sprayed into the furnace.

Figure 2 is a sectional view taken substantially along the broken line II—II of Fig. 1.

Figure 3 is an enlarged fragmentary detail view of the spray oscillating mechanism, with parts in section.

Figure 4 is another fragmentary elevational view of the spray oscillating mechanism.

As shown on the drawings:

The reference numeral 10 indicates generally a recovery furnace for use in the carrying out of the method of my invention. Said furnace 10 is of the horizontal type with a relatively elongated, narrow main portion defined by the side walls 11 and 12 and the end walls 13 and 14. A horizontally disposed boiler 15 is mounted near the top of the furnace lengthwise thereof. The gases of combustion enter the flues of said boiler 15 at one end thereof, as at 16, and pass outwardly from the other end thereof into a conduit 17, which may lead to a spray tower.

The furnace 10 is provided with a bottom wall 18 which slopes forwardly and downwardly from the rear end wall 13 toward a relatively deep pit, indicated by the reference numeral P adjacent the front end of the furnace. Such pit P is defined by the lower portion of the front end wall 14, by the lower continuations of the side walls 11 and 12 and by an intermediate vertical wall portion 21 which is joined to the sloping bottom wall 18 by a more steeply sloping portion 22. Tuyères 23 and 24 extend into the pit P through the lower portions of the side walls 11 and 12 in a downwardly inclined direction to terminate in spaced relation to the inclined floor 25 of the pit. A gap 26 is provided between the bottom of the front end wall 14 and said pit bottom wall 25 for drawing off molten inorganic chemicals into a dissolving tank 27 positioned therebelow.

A pair of parallel spaced rods or buckstays 28 and 29 extend horizontally along the furnace wall 12 to provide a guiding support for a bracket 30 secured thereto. Said bracket 30 is provided with an intermediate vertical portion 31 which is slotted as at 32 to serve as a guide for an oscillatable length of pipe 33 carrying a spray nozzle 34 at its inner free end within the furnace 10. Said spray nozzle pipe 33 extends through an opening 35 in the wall 12, other openings 36 and 37 being provided in said wall for alternative positions of the spray nozzle pipe 33. Said pipe 33 is provided intermediate its ends with a spherical enlargement 38 which is mounted in a spherical socket member 39 secured in said opening 35, as by means of bolts 40. This provides a ball and socket arrangement whereby the pipe 33 may be oscillated within the limits permitted by the size of the opening 35.

The outer end of the pipe 33 has a fitting 42 (Fig. 3) for connection to a flexible conduit 43, through which concentrated black liquor is led into the pipe 33 for spraying through the nozzle 34. Another fitting 44 on said outer end of the pipe 33 is connected by means of a flexible conduit 45 to a source of air under pressure. This air is used to spray the black liquor against the bottom of the boiler for the regeneration of black liquor from a sulfate process. Sodium sulfate is also introduced through the flexible conduit 45 and fitting 44 into the pipe 33.

The outer end of the pipe 33 is provided with an extension 46 that projects through said slot 32 in the guiding bracket 30 and is connected to an eccentric 47 by means of a connecting rod 48. The joints 49 and 56, respectively, between said extended end 46 and the connecting rod 48 and between said connecting rod and said eccentric strap or pin 47 are preferably of the ball and socket type of joint to permit universality of relative movement. A second connecting rod 50 is secured to the side of the pipe 33, as by a link 51, between the socket housing 39 and the fitting 44. Said connecting rod 50 is connected to an eccentric strap or pin 52 carried by a disk 53. The joints 54 and 55, between the connecting rod 50 and the strap 51 and between the connecting rod 50 and the eccentric strap 52, respectively, are likewise ball and socket joints.

The oscillating mechanism comprises a shaft 57 mounted in bearings 58 carried by a pair of vertical supports 59 from the flooring A. A sprocket wheel 60 is secured to said shaft 57 intermediate the bearings 58 and is adapted to be driven by means of a chain 61 through a speed reducing mechanism indicated generally by the reference numeral 62, from a suitable source of power (not shown). The eccentric disk 53 is mounted at one end of said shaft 57 and at the other end is mounted a disk 63 carrying the eccentric strap 47.

The action of the spray nozzle oscillating mechanism is to move the spray nozzle through a considerable arc both horizontally and vertically. This results from the fact that the pipe 33 carrying the spray nozzle 34 is pivoted at an intermediate point along its length in the socket housing 39 and while the connecting rod 50 is connected to the pipe at a point comparatively near the pivot point, the other connecting rod 48 is connected at the extreme outer end of the pipe. The movement of the eccentric strap 47 acting through the connecting rod 48 tends to oscillate the pipe 33 in a generally vertical plane through an arc indicated by the dotted lines in Fig. 3. The connecting rod 50, on the other hand, being connected to the side of the pipe 33, tends to rotate the pipe 33 on its own axis by reason of the action of the eccentric strap 52. The combination of these actions is a rather complicated movement of the spray nozzle 34 in a generally elliptical path, with the result that the black liquor sprayed from the nozzle is directed over a considerable area of the lower surface 64 of the boiler 15. The amount of oscillation of rotation of the spray nozzle 34 may be adjusted by adjustment of the length of throw of the eccentric straps 52 and 47.

The operation of the method of my invention will now be described.

In starting up a smelting furnace for the carrying out of my method, the furnace must first be heated to a predetermined degree by the use of foreign fuel, either solid or liquid. When the furnace has been brought up to temperature, concentrated black liquor together with air and added sodium sulfate, is sprayed into the furnace through the pipe 33 and nozzle 34. The concentration of the black liquor should be such as to render the black liquor self-supporting of combustion once the furnace has been brought up to temperature. Usually a black liquor of between 33 and 37° Bé. is employed.

The black liquor as it comes to the spray pipe 33 may be in a preheated condition but is not at a temperature above its atmospheric boiling point. It is preferably sprayed into the furnace in the form of a coarse spray and under sufficient pressure to cause the sprayed black liquor to impinge against the undersurface 64 of the boiler. By the time it reaches the surface 64, it is largely dehydrated and charred, due to its passage through the hot gases of combustion rising from the pit P. The oscillation of the spray nozzle 34 causes the sprayed black liquor to cover a considerable area of the boiler surface 64, which, being hot, further aids in the dehydration and charring of the black liquor. Masses or fragments of the dehydrated and charred black liquor drop from the surface 64 onto the sloping floor 18 or 22, or directly into the pit P, where a bed B of the black liquor residues is gradually built up. The inclination of the floors 18 and 22 is such as to cause any black liquor residue falling thereon to eventually slide down into the pit P.

Air is admitted through the tuyères 23 into the body of the bed B to supply sufficient air to burn the organic matter associated with the black liquor residue and convert such organic matter into partly burned gases, such as carbon monoxide. The amount of air introduced through the tuyères 23 is not, however, sufficient to create full oxidizing conditions within the bed B, but must maintain reducing conditions within said bed in order to effect an efficent reduction of the sulfate present to sulfide.

A part of the heat generated by the burning of organic matter in the bed B is utilized in melting the inorganic chemicals present, such as sodium sulfide, sodium carbonate and the like, and these molten chemicals are allowed to pass out through the opening 26 into the dissolving tank 27.

As the heated, partly burned gases rise from the pit P, they are drawn in a generally horizontal direction the full length of the furnace to the rear end 16 of the boiler. The air supplied with the sprayed black liquor through the nozzle 34 creates the force necessary to spray the liquor against the bottom of the boiler and also furnishes some of the secondary air required to complete the combustion of the gases rising from the smelting zone. The balance of the secondary air is supplied through the main furnace door and the openings 35, 36 and 37.

The spray burning method of my invention, once it has been started up, is self-sustaining, so that no foreign additional fuel need be used. The heat of combustion of the organic materials in the black liquor is sufficient not only to dehydrate the concentrated black liquor sprayed into the furnace but also to effect the reduction of the inorganic chemicals and convert them into a molten, flowable mass, from which the chemicals can be recovered and used in the making up of fresh cooking liquor.

One of the important advantages of my process is that it requires no considerable height of equipment nor a relatively expensive installation. This is largely due to the fact that the black liquor is sprayed in a generally upward direction into a more or less horizontally moving stream of heated gases and is caused to impinge against a suspended surface, such as the surface of a boiler, from which masses or fragments of the thoroughly dehydrated and charred black liquor drop to the floor of the furnace and into the reduction pit A long path of travel for the sprayed black liquor is therefore unnecessary in the carrying out of my process, whereas in processes where the black liquor is sprayed downwardly in a vertical direction, vertical retorts of considerable height are required to prevent the possibility of insufficiently dried black liquor residues falling upon the reduction bed and smothering it.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A self-sustaining process for the recovery of chemicals and heat in a horizontal type of recovery furnace from concentrated waste liquor, which comprises spraying said liquor in coarse particle form in a general upward direction into a stream of heated gases of combustion flowing in a generally horizontal direction, causing said sprayed liquor particles to impinge against an extended boiler surface constituting a ceiling above said stream of gases with sufficient pressure to adhere thereto to be dried thereon, whereby said liquor is dehydrated and organic matter therein largely volatilized to form charred residues which fall from said surface to build up a bed therebeneath, supplying a limited amount of air to said bed to partially burn organic combustibles therein to form incompletely burned gases, and supplying additional air to complete the burning of said gases while said gases are passing in a generally horizontal direction beneath said ceiling to provide said heated gases of combustion aforementioned.

2. A self-sustaining process for the recovery of chemicals and heat in a horizontal type of furnace from sulfate black liquor, which comprises spraying black liquor in coarse particle form in an initially upward direction into contact with heated gases of combustion flowing generally horizontally, varying the angle of spraying to cause said sprayed black liquor to impinge upon and temporarily adhere to an extended horizontally positioned boiler surface exposed to the heat of said gases, thereby largely dehydrating and charring said sprayed black liquor to form residues containing inorganic chemicals and organic combustibles, collecting said residues in a bed, supplying a limited amount of air to said organic combustibles therein to partially burn the same and form partly burned gases, utilizing the heat of burning of said combustibles to melt said inorganic chemicals in said bed, supplying additional air in the spraying zone to burn said partly burned gases and thereby provide said first mentioned heated gases of combustion, and withdrawing said melted inorganic chemicals from said bed.

3. The self-sustaining method of spray burning black liquor to recover heat and chemicals therefrom in a recovery unit having a steam boiler heat absorbing surface extending across the upper part of a smelting furnace, which comprises directing under pressure a relatively coarse spray of concentrated black liquor in a generally upward direction through highly heated gaseous products of combustion against the under side of the boiler heat absorbing surface to cause the partially dried sprayed black liquor to temporarily adhere thereto in a moist, tacky condition and become further dehydrated thereon, whereby dried residues of said sprayed black liquor slough off from said boiler heat absorbing surface in relatively large fragments to form a bed thereof therebeneath, and supplying a limited amount of air to said bed to burn said residues to provide the aforesaid heated gaseous products of combustion and to smelt the included chemicals.

4. The method of spray burning black liquor to recover heat and chemicals therefrom in a combined boiler and smelter type furnace wherein a steam boiler heat absorbing surface extends across the upper part of a smelting furnace, which comprises directing a coarse spray of relatively concentrated black liquor in a generally upward direction into a stream of highly heated gases moving in a generally horizontal direction, causing said sprayed black liquor to impinge against the steam boiler heat absorbing under surface as a target under sufficient impact pressure to adhere thereto to be dried thereon, whereupon dried residues of said sprayed black liquor fall from said surface to form a bed thereof therebeneath, and supplying a limited amount of air to said bed to partially burn said residues to provide the aforesaid heated gases and to smelt the included chemicals.

5. The method of spray burning black liquor to recover heat and chemicals therefrom in a combined boiler and smelter type furnace wherein a steam boiler heat absorbing surface extends across the upper part of a smelting furnace, which comprises directing a coarse spray of relatively concentrated black liquor through a continually varying arc in a generally upward direction into a stream of highly heated gases moving in a generally horizontal direction, causing said sprayed black liquor to impinge against the steam boiler heat absorbing under surface as a target under sufficient impact pressure to adhere thereto to be dried thereon, whereupon dried residues of said sprayed black liquor fall from said surface to form a bed thereof therebeneath, and supplying a limited amount of air to said bed to partially burn said residues to provide the aforesaid heated gases and to smelt the included chemicals.

ALFRED G. KERNIN.